(12) United States Patent
Zhang et al.

(10) Patent No.: US 8,488,340 B2
(45) Date of Patent: Jul. 16, 2013

(54) POWER CONVERTER WITH BOOST-BUCK-BUCK CONFIGURATION UTILIZING AN INTERMEDIATE POWER REGULATING CIRCUIT

(75) Inventors: Michael Zhang, Richardson, TX (US); Aaron Jungreis, Richardson, TX (US)

(73) Assignee: Flextronics AP, LLC, Broomfield, CO (US)

( * ) Notice: Subject to any disclaimer, the term of this patent is extended or adjusted under 35 U.S.C. 154(b) by 264 days.

(21) Appl. No.: 12/870,634

(22) Filed: Aug. 27, 2010

(65) Prior Publication Data

US 2012/0051097 A1   Mar. 1, 2012

(51) Int. Cl.
H02M 3/335 (2006.01)

(52) U.S. Cl.
USPC ............ 363/21.07; 363/21.1; 363/74

(58) Field of Classification Search
USPC ............ 363/21.02, 21.04, 21.07, 21.1, 74
See application file for complete search history.

(56) References Cited

U.S. PATENT DOCUMENTS

| | | |
|---|---|---|
| 4,051,425 A | 9/1977 | Smith |
| 4,184,197 A | 1/1980 | Cuk et al. |
| 4,273,406 A | 6/1981 | Okagami |
| 4,563,731 A | 1/1986 | Sato et al. |
| 4,645,278 A | 2/1987 | Yevak et al. |
| 4,695,933 A | 9/1987 | Nguyen et al. |
| 4,712,160 A | 12/1987 | Sato et al. |
| 4,788,626 A | 11/1988 | Neidig et al. |
| 4,806,110 A | 2/1989 | Lindeman |
| 4,823,249 A | 4/1989 | Garcia, II |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

EE Times.com—"Team Claims Midrange Wireless Energy Transfer", by R. Colin Johnson, 4 pages, Nov. 20, 2006.
EE Times.com—"Wireless Beacon Could Recharge Consumer Devices", by R. Colin Johnson, 3 pages, Jan. 11, 2007.
Hang-Seok Choi et al., Novel Zero-Voltage and Zero-Current-Switching (ZVZCS) Full-Bridge PWM Converter Using Coupled Output Inductor, Sep. 2002 IEEE, pp. 641-648.
"New Architectures for Radio-Frequency dc/dc Power Conversion", Juan Rivas et al., Laboratory for Electromagnetic and Electronic Systems, Massachusetts Institute of Technology, Room 10-171 Cambridge, MA 02139, pp. 4074-4084, Jan. 2004.

(Continued)

*Primary Examiner* — Adolf Berhane
*Assistant Examiner* — Lakaisha Jackson
(74) *Attorney, Agent, or Firm* — Haverstock & Owens, LLP

(57) ABSTRACT

A regulated power apparatus is provided. The apparatus includes an input power converting circuit configured for receiving a rectified voltage and for generating an increased voltage. An intermediate power regulating circuit generates a regulated voltage that has a lower voltage than a minimum output voltage of the input power converting circuit. The intermediate power regulating circuit is coupled to receive the increased voltage. An output power converting circuit is coupled with the intermediate power regulating circuit. The output power converting circuit receives the regulated voltage and generates an output voltage that is lower than the regulated voltage. The output power converting circuit comprises a buck converter configured to operate at a fixed duty cycle. A regulation circuit is coupled with the intermediate power regulating circuit and coupled with the output power converting circuit.

18 Claims, 7 Drawing Sheets

U.S. PATENT DOCUMENTS

| | | | |
|---|---|---|---|
| 4,975,821 A | 12/1990 | Lethellier |
| 5,090,919 A | 2/1992 | Tsuji |
| 5,101,322 A | 3/1992 | Ghaem et al. |
| 5,132,890 A | 7/1992 | Blandino |
| 5,164,657 A | 11/1992 | Gulczynski |
| 5,235,491 A | 8/1993 | Weiss |
| 5,262,932 A | 11/1993 | Stanley et al. |
| 5,295,044 A | 3/1994 | Araki et al. |
| 5,365,403 A | 11/1994 | Vinciarelli et al. |
| 5,438,294 A | 8/1995 | Smith |
| 5,490,052 A | 2/1996 | Yoshida et al. |
| 5,565,761 A | 10/1996 | Hwang |
| 5,565,781 A | 10/1996 | Dauge |
| 5,592,128 A | 1/1997 | Hwang |
| 5,673,185 A | 9/1997 | Albach et al. |
| 5,712,772 A | 1/1998 | Telefus et al. |
| 5,742,151 A | 4/1998 | Hwang |
| 5,747,977 A | 5/1998 | Hwang |
| 5,786,687 A | 7/1998 | Faulk |
| 5,786,992 A | 7/1998 | Vinciarelli et al. |
| 5,798,635 A | 8/1998 | Hwang et al. |
| 5,804,950 A | 9/1998 | Hwang et al. |
| 5,811,895 A | 9/1998 | Suzuki et al. |
| 5,818,207 A | 10/1998 | Hwang |
| 5,838,554 A | 11/1998 | Lanni |
| 5,859,771 A | 1/1999 | Kniegl |
| 5,870,294 A | 2/1999 | Cyr |
| 5,894,243 A | 4/1999 | Hwang |
| 5,903,138 A | 5/1999 | Hwang et al. |
| 5,905,369 A | 5/1999 | Ishii et al. |
| 5,923,543 A | 7/1999 | Choi |
| 6,009,008 A | 12/1999 | Pelly |
| 6,058,026 A | 5/2000 | Rozman |
| 6,069,803 A | 5/2000 | Cross |
| 6,091,233 A | 7/2000 | Hwang et al. |
| 6,091,611 A | 7/2000 | Lanni |
| 6,160,725 A | 12/2000 | Jansen |
| 6,183,302 B1 | 2/2001 | Daikuhara et al. |
| 6,272,015 B1 | 8/2001 | Mangtani |
| 6,282,092 B1 | 8/2001 | Okamoto et al. |
| 6,307,761 B1 | 10/2001 | Nakagawa |
| 6,323,627 B1 | 11/2001 | Schmiederer et al. |
| 6,326,740 B1 | 12/2001 | Chang et al. |
| 6,344,980 B1 | 2/2002 | Hwang et al. |
| 6,366,483 B1 | 4/2002 | Ma et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,277 B1 | 5/2002 | Fong et al. |
| 6,407,514 B1 | 6/2002 | Glaser et al. |
| 6,459,175 B1 | 10/2002 | Potega |
| 6,469,914 B1 | 10/2002 | Hwang et al. |
| 6,469,980 B1 | 10/2002 | Takemura et al. |
| 6,483,281 B2 | 11/2002 | Hwang |
| 6,487,095 B1 | 11/2002 | Malik et al. |
| 6,531,854 B2 | 3/2003 | Hwang |
| 6,541,944 B2 | 4/2003 | Hwang |
| 6,549,409 B1 | 4/2003 | Saxelby et al. |
| 6,583,999 B1 | 6/2003 | Spindler et al. |
| 6,605,930 B2 | 8/2003 | Hwang |
| 6,618,274 B2 | 9/2003 | Boylan et al. |
| 6,654,261 B2 | 11/2003 | Welches et al. |
| 6,657,417 B1 | 12/2003 | Hwang |
| 6,671,189 B2 | 12/2003 | Jansen et al. |
| 6,674,272 B2 | 1/2004 | Hwang |
| 6,721,192 B1 | 4/2004 | Yang et al. |
| 6,775,162 B2 | 8/2004 | Mihai et al. |
| 6,894,461 B1 | 5/2005 | Hack et al. |
| 6,899,434 B2 | 5/2005 | Morishita |
| 6,919,715 B2 | 7/2005 | Muratov et al. |
| 6,958,920 B2 | 10/2005 | Mednik et al. |
| 6,970,366 B2 | 11/2005 | Apeland et al. |
| 7,035,126 B1 | 4/2006 | Lanni |
| 7,038,406 B2 | 5/2006 | Wilson |
| 7,047,059 B2 | 5/2006 | Avrin et al. |
| 7,064,497 B1 | 6/2006 | Hsieh |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,286,376 B2 | 10/2007 | Yang |
| 7,324,354 B2 | 1/2008 | Joshi et al. |
| 7,386,286 B2 | 6/2008 | Petrovic et al. |
| 7,450,388 B2 | 11/2008 | Beihoff et al. |
| 7,499,301 B2 | 3/2009 | Zhou |
| 7,545,256 B2 | 6/2009 | O'Toole et al. |
| 7,564,706 B1 * | 7/2009 | Herbert ............... 363/124 |
| 7,570,497 B2 | 8/2009 | Jacques et al. |
| 7,639,520 B1 | 12/2009 | Zansky et al. |
| 7,701,305 B2 | 4/2010 | Lin et al. |
| 7,764,515 B2 | 7/2010 | Jansen et al. |
| 8,059,434 B2 * | 11/2011 | Huang et al. ............... 363/98 |
| 8,102,678 B2 | 1/2012 | Jungreis |
| 8,134,848 B2 * | 3/2012 | Whittam et al. ............ 363/84 |
| 8,207,717 B2 * | 6/2012 | Uruno et al. ............... 323/262 |
| 8,243,472 B2 * | 8/2012 | Chang et al. ............... 363/16 |
| 8,369,111 B2 * | 2/2013 | Balakrishnan et al. ..... 363/21.15 |
| 8,400,801 B2 * | 3/2013 | Shinoda ............... 363/131 |
| 2002/0008963 A1 | 1/2002 | Dibene, II et al. |
| 2002/0011823 A1 | 1/2002 | Lee |
| 2002/0036200 A1 | 3/2002 | Ulrich |
| 2003/0035303 A1 | 2/2003 | Balakrishnan et al. |
| 2004/0183510 A1 | 9/2004 | Sutardja et al. |
| 2004/0228153 A1 | 11/2004 | Cao et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0105224 A1 | 5/2005 | Nishi |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2005/0281425 A1 | 12/2005 | Gruet et al. |
| 2006/0002155 A1 | 1/2006 | Shteynberg et al. |
| 2006/0022637 A1 | 2/2006 | Wang et al. |
| 2006/0109696 A1 | 5/2006 | Ren et al. |
| 2006/0152947 A1 | 7/2006 | Baker et al. |
| 2006/0213890 A1 * | 9/2006 | Kooken et al. ............ 219/130.21 |
| 2007/0040516 A1 | 2/2007 | Chen |
| 2007/0051712 A1 | 3/2007 | Kooken et al. |
| 2007/0138971 A1 | 6/2007 | Chen |
| 2007/0247091 A1 * | 10/2007 | Maiocchi ............... 318/254 |
| 2007/0247877 A1 | 10/2007 | Kwon et al. |
| 2007/0263415 A1 | 11/2007 | Jansen et al. |
| 2008/0043496 A1 | 2/2008 | Yang |
| 2008/0191667 A1 | 8/2008 | Kernahan et al. |
| 2009/0290384 A1 | 11/2009 | Jungreis |
| 2009/0290385 A1 * | 11/2009 | Jungreis et al. ............... 363/17 |
| 2010/0039833 A1 | 2/2010 | Coulson et al. |
| 2010/0289466 A1 | 11/2010 | Telefus |
| 2010/0322441 A1 | 12/2010 | Weiss et al. |
| 2011/0132899 A1 * | 6/2011 | Shimomugi et al. ......... 219/620 |
| 2011/0261590 A1 | 10/2011 | Liu |
| 2012/0112657 A1 * | 5/2012 | Van Der Veen et al. ...... 315/291 |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

"Electronic Transformer for a 12V Halogen Lamp", by Scollo, P. Fichera R., Jan. 1999, ST Microelectronics pp. 1-4.

"An Automatic Line Voltage Switching Circuit", SGS-Thomson Microelectronics, Application Note by Vajapeyam Sukumar and Thierry Castagnet, 6 pages, copyright 1995, printed in Italy.

International Search Report, PCT/US2011/49438, International filing date Aug. 26, 2011, 10 pages.

* cited by examiner

POWER CONVERTER WITH BOOST-BUCK-BUCK CONFIGURATION UTILIZING AN INTERMEDIATE POWER REGULATING CIRCUIT

FIELD OF THE INVENTION

The present invention relates to the field of power converters. More particularly, the present invention relates to a multistage boost-buck-buck power apparatus.

BACKGROUND

In many applications a voltage regulator is required to provide a voltage within a predetermined range formed from a voltage source having a different voltage level. Some circuits are subject to uncertain and undesirable functioning and even irreparable damage if an input power falls outside a certain range.

A prior art regulated power apparatus 10 is shown in FIG. 1. The apparatus 10 is a boost-boost-isolated power converter. The apparatus 10 generally includes an AC input 12, also known as an AC to DC converter, coupled with an input converter 14. In the exemplary embodiment shown, the input converter 14 comprises a power factor correction (PFC) frontend. The input converter 14 is able to be configured as a boost converter. The input converter 14 is coupled with an intermediate regulator 16 comprising another boost regulator which is coupled with an output converter 18, in this case a DC-DC converter. The output converter 18 is configured as a isolation stage. A regulation circuit 20 is coupled between the intermediate regulator 16 and the output converter 18.

The AC input 12 is coupled to receive an AC signal VAC and to generate an unregulated direct current (DC) coupled as an input to the input converter 14. Typically, the input converter 14 receives the unregulated direct current from the AC input 12 and generates a boosted or increased voltage. The increased voltage is a DC voltage. The intermediate regulator 16 receives the increased voltage and generates a regulated voltage. The regulated voltage comprises a voltage that is boosted higher than a minimum output voltage of the input converter. The output converter 18 receives the regulated higher voltage and generates an output voltage that is bucked down or lower than the higher regulated voltage. The regulation circuit 20 senses a power drop and power increase in Vout and controls a duty cycle of a regulation switching element within the intermediate regulator 16 to supply a compensating power to correct the power increase or power drop in Vout.

There are many inherent drawbacks associated with the apparatus 10. The apparatus 10 generates high surge current at start-up. Secondary components of the output converter 18 undergo high stress and the apparatus is exposed to high noise levels from the surge current. Additionally, the primary components of the output converter 18 also endure a high voltage stress. The apparatus 10 being a boost-boost-isolation power converter, is bulky and inefficient.

Another prior art power regulator similar to the apparatus 10 uses a buck type PFC front end, followed by a buck converter coupled with a buck type down converter. This other prior art has an inherent drawback of low power factor correction at low input AC line and has symptoms of discontinued input current requiring large filters to smooth out a switching ripple current. Further, this other prior art suffers from the buck PFC front end running at a relatively low efficiency compared to a boost type of front end. Also, this buck-buck-isolation configuration suffers from a high RMS current requiring high copper loss on the primary side due to a relatively low voltage coming from the two buck converters upstream.

Accordingly, it is desirable to create a regulated power converter to greatly increase the efficiency and decrease the cost of such power converters.

SUMMARY OF THE INVENTION

An exemplary way to operate the converter of the present invention is to configure a PFC front end stage as a boost follower stage so that the output voltage of the PFC front end stage is only slightly higher than the peak of an AC input. A buck regulator stage coupled with the PFC front end stage is configured to produce a fixed output voltage slightly lower than the minimum output voltage of the PFC stage. Designing the output voltage of the buck regulator as close as possible to the minimum output voltage of the PFC stage produces the highest overall converter efficiency. The converter of the present invention thus produces an optimal balance between efficiencies at a low-line and a high-line.

In accordance with a first aspect of the present invention, a regulated power apparatus is provided. The apparatus includes an input power converting circuit configured for receiving a rectified voltage and for generating an increased voltage. An intermediate power regulating circuit generates a regulated voltage that has a either a lower voltage or a higher voltage than a minimum output voltage of the input power converting circuit. The intermediate power regulating circuit is coupled to receive the increased voltage. An output power converting circuit is coupled with the intermediate power regulating circuit comprising a plurality of switching elements and a transformer. The output power converting circuit receives the regulated voltage and generates an output voltage that is lower than or higher than the regulated voltage. The output power converting circuit comprises an isolation stage configured to preferable operate at a fixed duty cycle. A regulation circuit is coupled with the intermediate power regulating circuit and coupled with the output power converting circuit. The regulation circuit includes a feedback signal for generating a control signal for operating a regulation switching element of the intermediate power regulating circuit.

The input power converting circuit comprises a boost converter including a boost switching element coupled with an inductive element and coupled with a plurality of boost diode devices. The boost converter is configured with a power factor correction function for increasing a power factor of the power apparatus. The boost converter is configured as a boost follower, wherein the increased voltage is greater than the rectified voltage. The boost follower includes a boost follower controller coupled with the boost switching element. An AC input circuit is provided for receiving an AC signal and generating the rectified voltage.

The intermediate power regulating circuit includes a buck converter followed by a boost converter which includes the regulation switching element coupled with an inductive element shared between the converters and which is coupled with a regulator diode device. Alternatively, the intermediate power regulating circuit includes a SEPIC (single-ended primary inductance converter) converter, wherein the regulated voltage can have a lower voltage or a higher voltage than the minimum output voltage of the input power converting circuit. The SEPIC converter comprises the regulation switching element coupled with an inductive element and coupled with a capacitive element. The capacitive element is coupled with a second inductive element and coupled with a diode device.

In yet another alternative, the intermediate power regulating circuit includes a buck-boost converter which includes a regulation switching element coupled with an inductive element and coupled with a passing device. The regulation switching element is coupled in series with an input of the buck-boost converter.

Other features of the present invention will become apparent from consideration of the following description taken in conjunction with the accompanying drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

Figure 1:
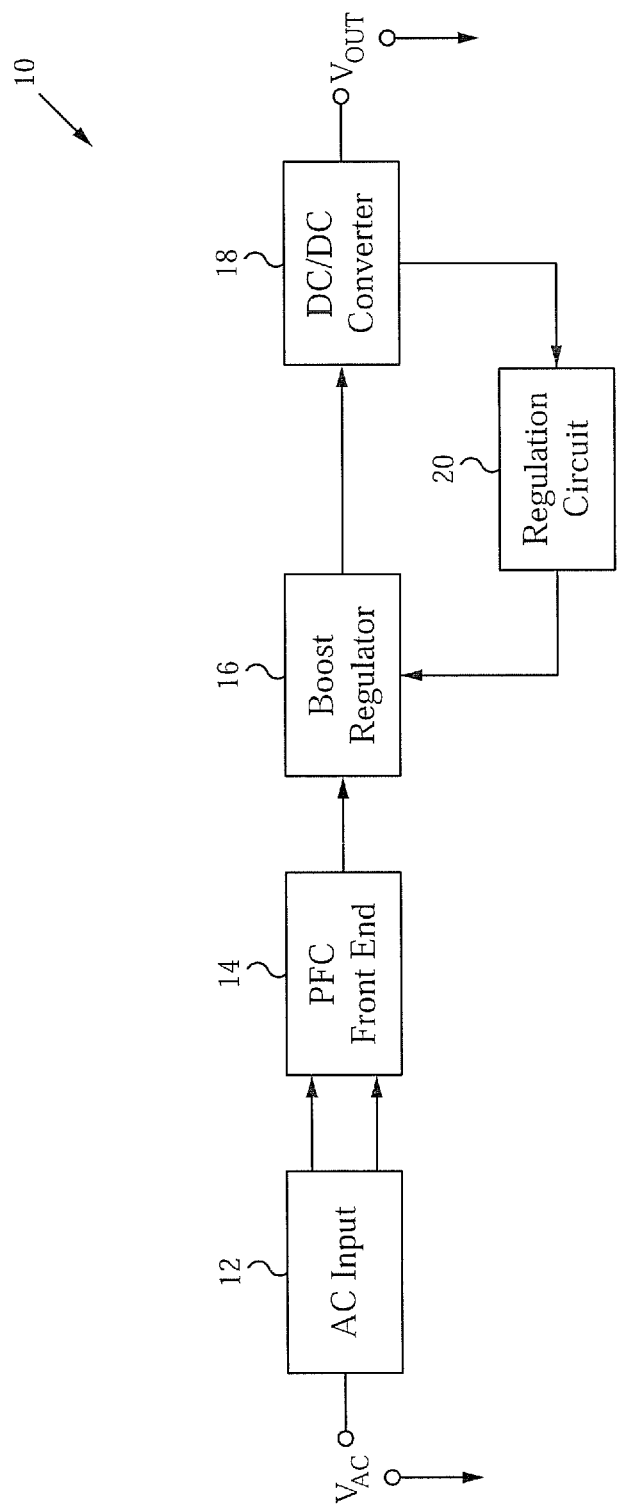
FIG. 1 illustrates a functional block diagram of a prior art power apparatus.
Figure 1A:
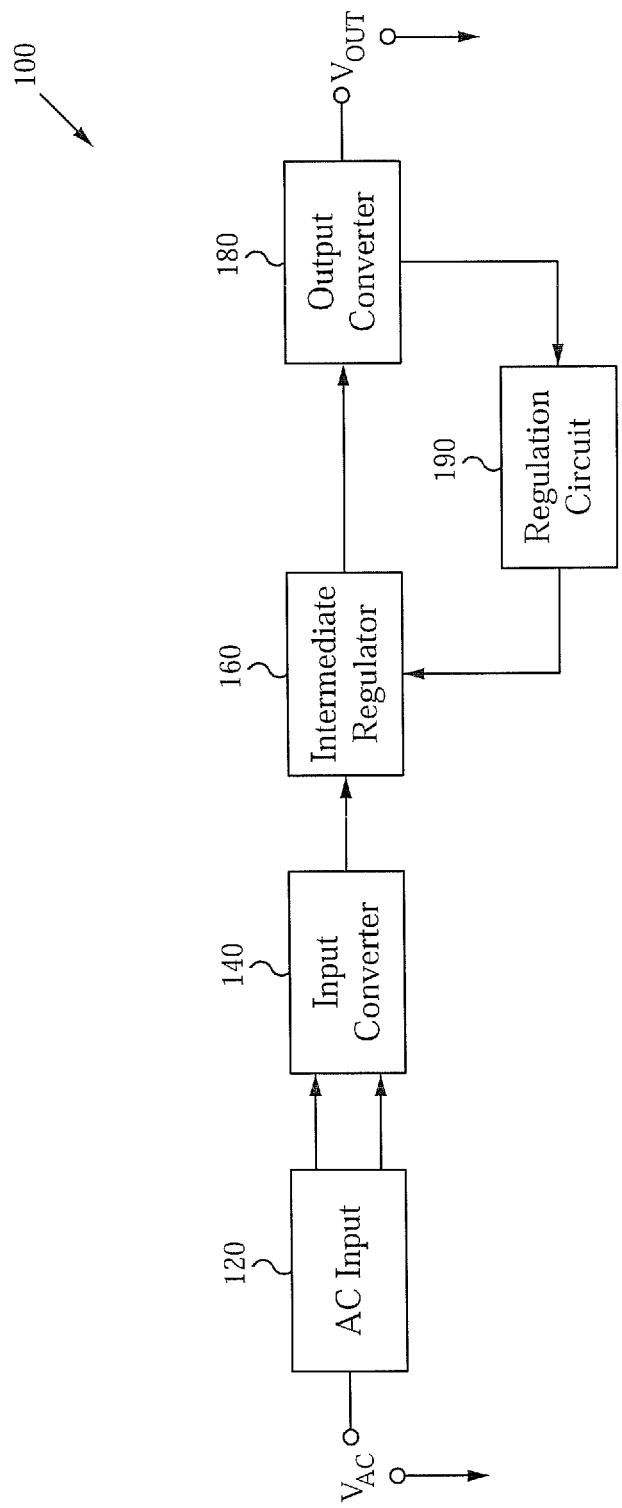
FIG. 1A illustrates a functional block diagram of a power apparatus in accordance with an embodiment of the invention.

FIG. 1A shows an embodiment of the current invention having a intermediate regulator 160. An exemplary way to operate the converter of the present invention is to configure the PFC front end stage 140 as a boost follower stage so that the output voltage of the PFC front end stage is only slightly higher than the peak of the AC input 120. So for example, the PFC output might be about 250 VDC for an AC input of 114 VAC and the PFC output might be about 385 VDC for and AC input of 230 VAC. The intermediate regulator stage 160 is configured to produce a fixed predetermined output voltage. An exemplary embodiment can be designed to produce a fixed voltage slightly lower than the minimum output voltage of the PFC stage 140. By way of example, the PFC front end 140 might be designed to produce a minimum output voltage of 240 VDC for a 90 to 132 VAC input and the intermediate regulator stage 160 designed to produce a fixed output voltage of 200 VDC, or alternatively 175 VDC. Designing the output voltage of the intermediate regulator 160 as close as possible to the minimum output voltage of the PFC stage produces the highest overall converter efficiency.

In typical or conventional converters, the high-line efficiency is much higher than the low-line efficiency due to a decrease in conduction losses. The converter of the present invention achieves high conversion efficiency at low-line while only slightly reducing high-line efficiency where there is a greater margin in the efficiency. This high conversion efficiency is preferably achieved by using a boost-follower on the PFC stage and by using an intermediate buck regulation stage operating with an output voltage slightly below the lowest boost-follower output voltage. The converter of the present invention thus produces an optimal balance between efficiencies at the low-line and the high-line.

Turning to FIG. 1A, a functional block diagram is shown for a regulated power apparatus 100 according to the present invention. The apparatus 100 is configured as a boost-intermediate stage isolated power converter. This configuration has a superior efficiency and superior operating characteristics over prior art systems. The apparatus 100 generally includes an AC input 120, also known as an AC to DC converter. The AC input 120 is coupled to provide an unregulated DC voltage to an input power converting circuit or input converter 140, also known as a power factor correction (PFC) front-end. The input converter 140 is coupled with an intermediate power regulating circuit or intermediate regulator 160 preferably comprising a buck regulator in series with a boost regulator. The intermediate regulator 160 is coupled with an output converter 180 for providing isolation. A regulation circuit 190 is coupled between the intermediate regulator 160 and the output converter 180.

The AC input 120 is coupled to receive an AC signal VAC and to generate the unregulated DC therefrom. The unregulated DC voltage is coupled as an input to the input converter 140. The input converter 140 receives the unregulated direct current from the AC input 120 and generates a boosted or increased voltage. The increased voltage is a DC voltage. The intermediate regulator 160 receives the increased voltage and generates a regulated voltage therefrom. In some embodiments, the regulated voltage comprises a voltage that is lower than a minimum output voltage of the input converter. Preferably, the output converter 180 generates an isolated output that requires no voltage control. The regulation circuit 190 senses a power drop and power increase in Vout and controls a duty cycle of a regulation switching element within the intermediate regulator 160 to supply a compensating power to correct the power increase or power drop in Vout.

Figure 2:
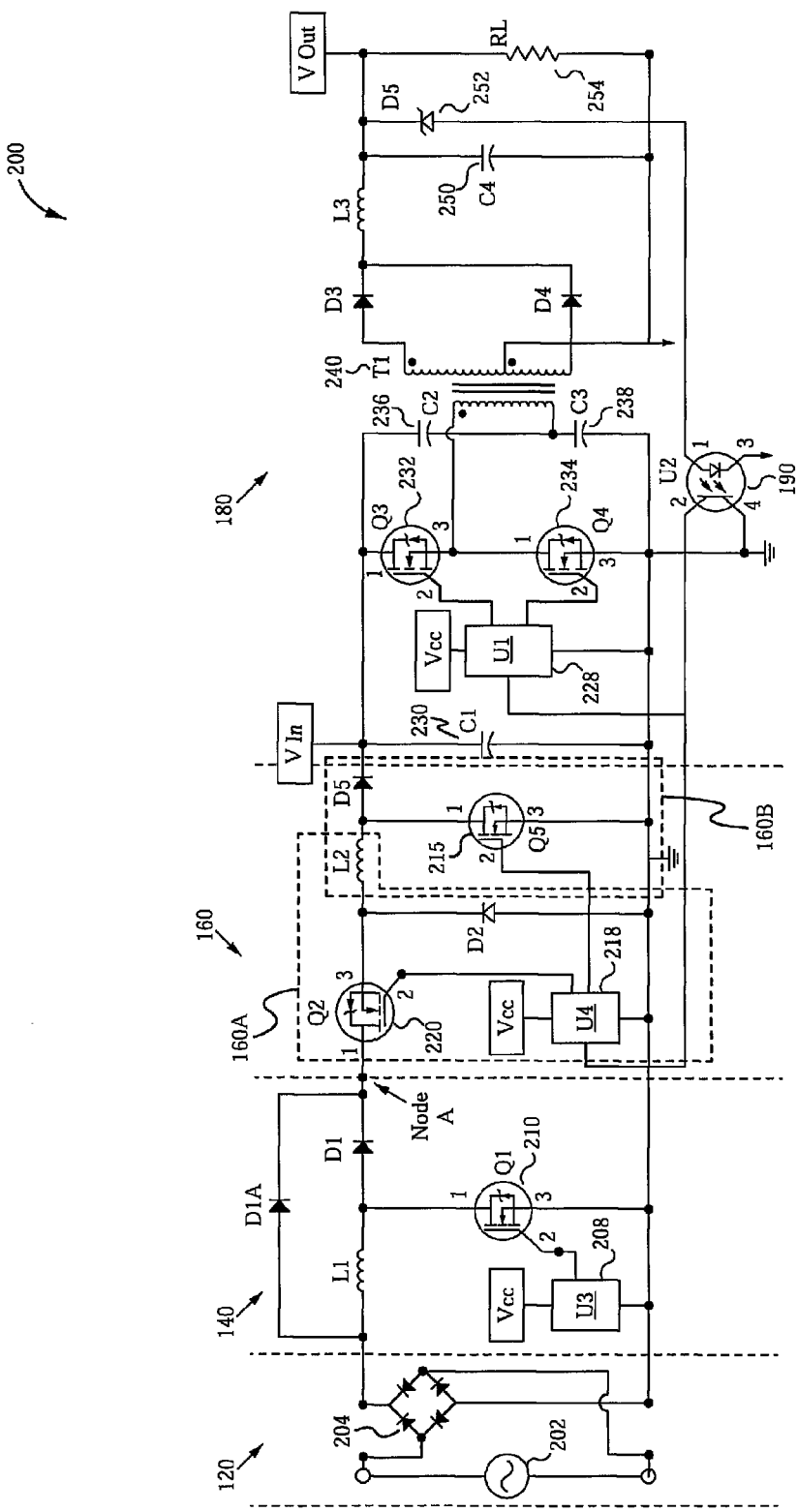
FIGS. 2 and 2A illustrate schematic diagrams of a power apparatus in accordance with embodiments of the invention.

FIG. 2 illustrates an exemplary schematic diagram of the regulated power apparatus 100 of FIG. 1A. A regulated power apparatus 200 is provided according to an embodiment of the present invention. The apparatus 200 is configured as a boost-intermediate stage isolated regulated power converter. The apparatus 200 generally includes an AC input 120 coupled with an input converter 140. The input converter 140 is coupled with an intermediate regulator 160 comprising a buck regulator 160A which is selectively coupled with an output converter 180 depending on application conditions. During application conditions in which a lower output voltage than the voltage generated by the input stage 140 is needed, the buck regulator 160A is selectively coupled with the output. During application conditions requiring a higher output voltage than generated by the input, a boost converter 160B is selectively coupled with the output in order to generate a higher voltage. A regulation circuit 190 is coupled between the intermediate regulator 160 and the output converter 180. A person of skill in the art having the benefit of this disclosure will appreciate the alternative schematic variations of the input converter 140, the intermediate regulator 160 and the output converter 180 described below.

The AC input 120 includes an input for receiving an AC signal 202 and preferably a four-diode bridge 204. The AC signal 202 typically is in the range of 90-265 VAC. The AC signal 202 is rectified by the four-diode bridge 204 to generate a rectified voltage that is an unregulated DC voltage. An electromagnetic interference (EMI) and a radio frequency interference (RFI) filter (not shown) can be included in the AC input 120 to eliminate unwanted harmonic noise.

The four-diode bridge 204 has an input and an output. The AC input voltage 202 is coupled to the input of the four-diode bridge 204. The positive output terminal of the four-diode bridge 204 is coupled to a first terminal of an inductor L1 and to the anode of a boosting diode D1A. The second terminal of the inductor L1 is coupled to a first terminal of a boost switching element 210 and to the anode of a boosting diode D1. The cathodes of the boosting diodes D1, D1A are coupled to Node A. The negative output terminal of the four-diode bridge 204 is coupled to the circuit ground. A second terminal of the switching element 210 is coupled with a boost controller 208. A third terminal of the switching element 210 is coupled to ground. The boost controller 208 is coupled to ground.

The input converter 140 receives the rectified voltage and generates an increased voltage. The input converter 140 is configured as a boost converter. The boost controller 208 is coupled with the boost switching element 210. Suitable components can be chosen for the input converter 140 depending on the output requirements for the power apparatus 200. In an exemplary embodiment, the boost switching element 210 comprises a silicon (Si) or silicon carbide (SiC) MOSFET transistor. The boosting diodes D1, D1A can also comprise a silicon (Si) or silicon carbide (SiC) material. The boost controller 208 can comprise a logic device that includes a pulse width modulation (PWM) function. Such PWM controllers are known to a person of skill in the art.

The input converter 140 can be configured to operate as a power factor correction (PFC) front-end. The input converter 140 uses the boost controller 208 to adjust the duty cycle of the boost switching element 210 such that an input current and a line frequency of the AC signal 202 are the same phase. Thereby providing a power factor of the power apparatus 200 that approaches unity (1.0). The input converter 140 generates the increased voltage using the boost controller 208 for controlling a duty cycle of the boost switching element 210 whereas the inductor L1 stores and passes the increased voltage via the boosting diodes D1, D1A.

The intermediate regulator 160 receives the increased voltage and generates a regulated voltage Vin. The intermediate regulator 160 is able to be configured as a buck converter 160A in application conditions where the regulated voltage Vin is required to be lower voltage than a minimum output voltage of the input converter 140. The intermediate regulator 160 includes a first terminal of a regulation switching element 220 coupled to a Node A. A second terminal of the regulation switching element 220 is coupled with a regulator controller 218. A third terminal of the regulation switching element 220 is coupled to a first terminal of an inductor L2 and to a cathode of a regulator diode D2. A second terminal of the inductor L2 is coupled to a Node Vin. The anode of the regulator diode D2 and the regulator controller 218 are coupled to ground. The intermediate regulator 160 uses a feedback signal provided by a feedback loop comprising the regulation circuit 190 and a shunting diode 252. A cathode of the shunting diode 252 is coupled to a Node Vout. The Node Vout is an output that is incident with the output voltage Vout. An anode of the shunting diode 252 is coupled to a first terminal of the regulation circuit 190. A second terminal of the regulation circuit 190 is coupled to the regulator controller 218. The intermediate regulator 160 generates the regulated voltage Vin using the regulator controller 218 for controlling a duty cycle of the regulation switching element 220. The inductor L2 alternately stores and passes power to the output converter 180 and through the regulator diode D2.

Suitable components can be chosen for the intermediate regulator 160 depending on the output requirements for the power apparatus 200. In an exemplary embodiment, the regulator switching element 220 comprises a silicon (Si) or silicon carbide (SiC) MOSFET transistor. The regulator diode D2 can also comprise a silicon (Si) or silicon carbide (SiC) material. The regulator controller 218 can comprise a logic device that includes a pulse width modulation (PWM) function. Such PWM controllers are known to a person of skill in the art. Furthermore, for higher power applications and to account issues relating to separate grounding, isolated gate bipolar transistors (IGBTs) are able to be used to as switching devices.

The intermediate regulator 160 being configured as a buck converter 160A uses the regulator controller 218 to adjust the duty cycle of the regulator switching element 220 such that the regulated voltage Vin at the Node Vin is regulated and lower than the minimum output voltage of the input converter 140. The regulated voltage Vin comprises a fixed DC voltage. The intermediate regulator 160 is configured to provide the regulated fixed voltage Vin that is as close as possible to the minimum output voltage of the input converter 140 in order to maximize an efficiency of the power apparatus 200. In an exemplary embodiment the regulated voltage is 200 VDC. Alternatively, the regulated voltage Vin is 175 VDC.

When in Buck configuration 160A, the switching element Q2 220 is enabled, or conducting, during a charging stage wherein the converter 160A delivers current to a load through the inductor L2. During a discharge stage, Q2 220 is disabled, or open, and energy stored in the inductor L2 causes the voltage across L2 to reverse, thereby forward biasing the diode D2. As a result, a current path is formed across D2, L2 and a load to discharge the energy within L2 as current into a load. During operation as a buck converter 160A, controller U3 228 preferably disables the switch Q5 so that no current may flow therethrough.

Figure 2A:
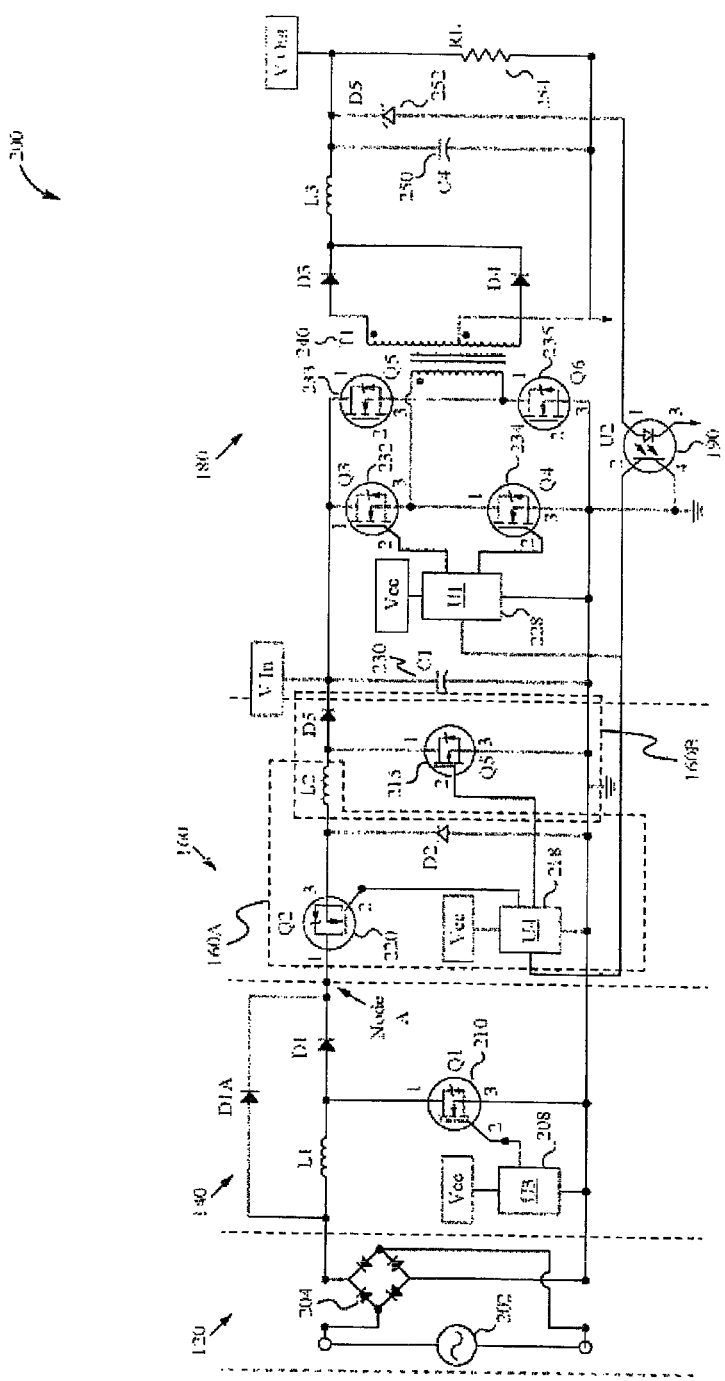

The output converter 180 is configured to receive the regulated voltage Vin and to generate the output voltage Vout. Preferably, the voltage Vout is DC isolated from the voltage Vin. In this example, the output converter 180 is configured as an LLC resonant converter. In other embodiments, the output converter 180 can be configured as a full bridge forward converter operating at a fixed duty cycle as shown in FIG. 2A wherein the isolation capacitors 236 and 238 are replaced by switching element Q5 233 and switching element Q6 235 which are coupled to the output controller 228 such that the output controller is able to control the switching of the switching elements 233, 235 in coordination with the switching of the switching elements 232, 234. Preferably, the output converter 180 is an isolation stage configured to achieve isolation without voltage control. The output converter 180 includes a first terminal of an input capacitor 230 coupled to the Node Vin and a second terminal of the input capacitor 230 coupled to ground. A first terminal of a first switching element or output switch 232 is coupled to the Node Vin and to a first terminal of a first isolation capacitor 236. The second terminal of the first switching element 232 is coupled with an output controller 228. A third terminal of the first switching element 232 is coupled to a first terminal of a second switching element or output switch 234 and to a first primary terminal of a transformer 240. The second terminal of the first isolation capacitor 236 is coupled to the first terminal of the second isolation capacitor 238 and coupled to the second primary terminal of the transformer 240. The second terminal of the second switching element 234 is coupled with the output controller 228. The output controller 228 is coupled to the second terminal of the regulation circuit 190. The output controller 228 is also coupled to ground. The third terminal of the second switching element 234 and the second terminal of the second isolation capacitor 238 are coupled to ground. A third and a fourth terminal of the regulation circuit 190 are coupled to ground.

An anode of a first output diode D3 is coupled to a first secondary terminal of the transformer 240. A cathode of the first output diode D3 is coupled to a first terminal of an output inductor L3 and to a cathode of a second output diode D4. An anode of the second output diode D4 is coupled to a second secondary terminal of the transformer 240. A center-tap of the transformer 240 is coupled to ground. A second terminal of the output inductor L3 is coupled to a first terminal of an output capacitor 250 and to the Node Vout. A second terminal of the output capacitor 250 is coupled to ground. A load 254 is coupled between the Node Vout and ground.

The output converter 180 generates the output voltage Vout using the output controller 228. The output controller 228 monitors the output voltage Vout and controls the duty cycle of the output switches 232, 234. The output controller reduces or increases the duty cycle of the output switches 232, 234 if the output voltage Vout increases or decreases respectively. The output controller 228 uses the feedback signal provided by the feedback loop comprising the regulation circuit 190 and the shunting diode 252. The shunting diode 252 is coupled to the regulation circuit 190 which is also coupled to the output controller 228. The output controller 228 generates a control signal for controlling the duty cycle of the first and second output switches 232, 234. The output controller 228 controls a conduction of the first and second output switches 232, 234 such that only one of the first and second output switches 232, 234 conducts at a time. The conduction of the first and the second output switches 232, 234 alternately generate a forward bias current in the first and the second output diodes D3, D4 respectively. The forward bias current is generated from an expanding and collapsing magnetic field of the transformer 240. The conduction of the first and second output diodes D3, D4 alternately charge the output capacitor 250 via the output inductor L3.

Suitable components can be chosen for the output converter 180 depending on the output requirements for the power apparatus 200. In an exemplary embodiment, the first and second output switches 232, 234 comprise a silicon (Si) or silicon carbide (SiC) MOSFET transistor. The output diodes D3, D4 can also comprise a silicon (Si) or silicon carbide (SiC) material. The output controller 218 can comprise a logic device that includes a pulse width modulation (PWM) function. Such PWM controllers are known to a person of skill in the art. The regulation circuit 190 can comprise a suitable feedback circuit which can be and is not limited to an optical isolator. The shunting diode 252 can comprise a zener diode made of suitable material known to a person of skill in the art. A size can be chosen for the input capacitor 230 depending on a holdup time specification chosen for the power apparatus 200. The holdup time is the amount of time the power apparatus can still supply power to the load 254 after loss of power from the AC input 120. Typically, the holdup time comprises a range of 15-50 milliseconds.

In some embodiments, D5 and Q5 215 are added to the topology shown to make use of the inductor L2 and capacitor C1 230 already present to form a boost converter 160B when a higher output voltage than the voltage provided by the input converter 140. In such situations, the voltage on the main bulk capacitor C1 230 on the output from the PFC stage quickly decreases to the point that the following buck converter can no longer operate and still produce adequate voltage at its output. To that end, the additional components D5 and Q5 215 are preferably controlled by PWM by U4 218 when the input to the buck converter falls below the output. The voltage across the bulk capacitor will then be boosted rather than bucked and allow increased hold up time while the bulk capacitor discharges to smaller voltages. Preferably, during standard operation while power is being provided D5 remains forward biased and conducting and Q5 215 remains off and appears as an open circuit.

In operation as a boost converter 160B, the switch Q2 220 is preferably enabled by the controller U4 218 and may be approximated as a short circuit from drain to source, or collector to emitter in the case of bipolar or IGBT switches. The switch Q5 215 is selectively enabled and disabled to form the boost converter 160B. When the switch Q5 215 is enabled, a current is developed in the inductor L2 which increases according to the time constant of the circuit. This is generally known as the storage phase. The switch Q2 215 is then opened after some small period of time and as a result the voltage across the switch Q2 215 to increases as the inductor L2's collapsing magnetic field attempts to maintain the current. Since the switch Q2 215 effectively becomes an open circuit, the voltage continues to rise until current is conducted through the diode D5. Current is driven through the diode D5 until the energy that is stored in the inductor L2 is expended This is generally known as the delivery phase. Since the inductor L2 can effectively boost the supply voltage by a factor of 10-15 it is possible to charge high voltage capacitors from a low voltage battery source.

Advantageously, the intermediate regulator 160 is able to be used as a buck converter 160A or a boost converter 160B selectively as output voltage demands are lower than the voltage provided by the input converter 140 or higher than the input converter 140 respectively. Furthermore, it is important to note that the inductor L2 is able to be used either during buck conversion or boost conversion. Generally, inductors are one of the costliest components in any converter system, and their cost increases greatly as their power handling capability is increased. As a result, it is an advantage to selectively switch between a buck converter 160A and a boost converter 160B while only utilizing one inductor L2.

Figure 3:
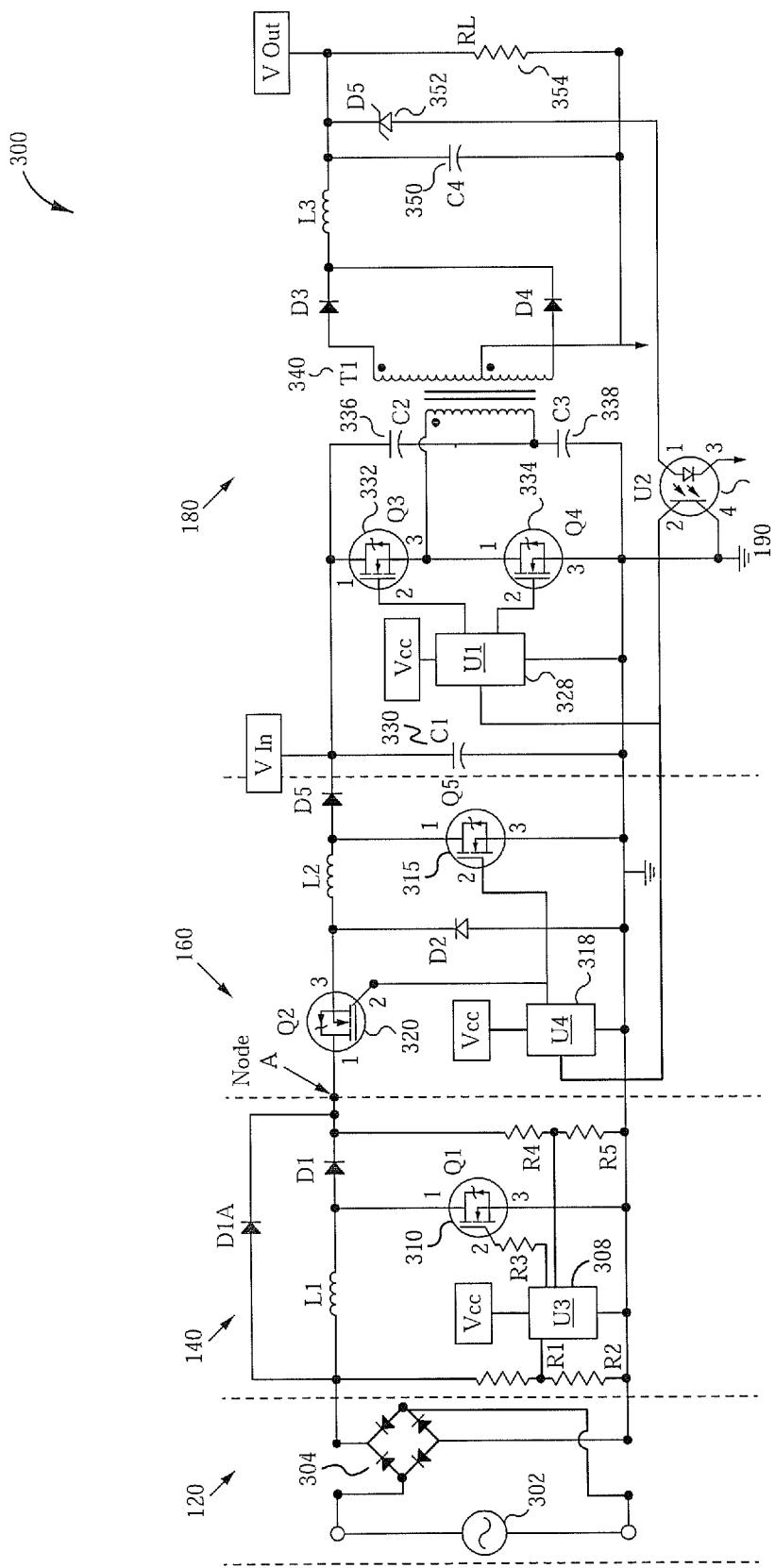
FIG. 3 illustrates a schematic diagram of a power apparatus in accordance with an alternative embodiment of the invention.

FIG. 3 illustrates an alternative exemplary schematic diagram of the regulated power apparatus 100 of FIG. 1A. A regulated power apparatus 300 is provided according to an embodiment of the present invention. The apparatus 300 is configured as a boost-intermediate stage isolated regulated power converter. The apparatus 300 generally includes an AC input 120 coupled with an input converter 140. The input converter 140 is coupled with an intermediate regulator 160 comprising a buck regulator which is coupled with an output converter 180. A regulation circuit 190 is coupled between the intermediate regulator 160 and the output converter 180.

The AC input 120 includes an input for receiving an AC signal 302 and a four-diode bridge 304. The AC signal 302 typically is in the range of 90-265 VAC. The AC signal 302 is rectified by the four-diode bridge 304 to generate a rectified voltage that is an unregulated DC voltage. An electromagnetic interference (EMI) and an radio frequency interference (RFI) filter (not shown) can be included in the AC input to eliminate unwanted harmonic noise. The four-diode bridge 304 has an input and an output. The AC input voltage 302 is coupled to the input of the four-diode bridge 304. The positive output terminal of the four-diode bridge 304 is coupled to a first terminal of an inductor L1 and to the anode of a boosting diode D1A. The second terminal of the inductor L1 is coupled to a first terminal of a boost switching element 310 and to the anode of a boosting diode D1. The cathodes of the boosting diodes D1, D1A are coupled to Node A. The negative output terminal of the four-diode bridge 304 is coupled to the circuit ground. A second terminal of the switching element 310 is coupled with a boost controller 308 through resistor R3. A voltage divider R1, R2 is coupled to an input of the boost controller 308 and coupled between the first terminal of the inductor L1 and ground. A voltage divider R4, R5 is coupled to the boost controller 308 and coupled between the Node A and ground. A third terminal of the switching element 310 is coupled to ground. The boost controller 308 is coupled to ground.

The input converter 140 receives the rectified voltage and generates an increased voltage. The input converter 140 is configured to function as a boost follower. The boost controller 308 is coupled with the boost switching element 310. A resistive network is coupled with the boost follower controller 308 comprising resistors R1-R5. Suitable components can be chosen for the input converter 140 depending on the output requirements for the power apparatus 300. In an exemplary embodiment, the boost switching element 310 comprises a silicon (Si) or silicon carbide (SiC) MOSFET transistor. The boosting diodes D1, D1A can also comprise a silicon (Si) or silicon carbide (SiC) material. The boost follower controller 308 can comprise a logic device that includes a pulse width modulation (PWM) function. Such PWM controllers are known to a person of skill in the art.

The input converter 140 can be configured to operate as a power factor correction (PFC) front-end. The input converter 140 uses the boost follower controller 308 to adjust the duty cycle of the boost switching element 310 such that an input current and a line frequency of the AC signal 302 are the same phase. Thereby providing a power factor of the power apparatus 300 that approaches unity (1.0). The input converter 140 generates the increased voltage using the boost follower controller 308 for controlling a duty cycle of the boost switching element 310 whereas the inductor L1 stores and passes the increased voltage via the boosting diodes D1, D1A. The input converter 140 being configured as a boost follower can generate the increased voltage such that the potential of the increased voltage varies proportionally depending on a potential of the AC signal 302. The boost follower function allows the input converter 140 to generate the increased voltage that is only slightly higher than the AC signal 302. The resistor network R1-R5 facilitates the boost follower function and provides a feedback signal to the boost follower controller 308. For example, the input converter 140 generates an increased voltage of 250 VDC for the AC signal 302 of 115 VAC. Alternatively, the input converter 140 generates an increased voltage of 385 VDC for the AC signal 302 of 230 VAC.

The intermediate regulator 160 receives the increased voltage and generates a regulated voltage Vin. The intermediate regulator 160 is able to be configured as a buck/boost converter. The regulated voltage Vin has a lower voltage than a minimum output voltage of the input converter 140. The intermediate regulator 160 includes a first terminal of a regulation switching element 320 coupled to a Node A. A second terminal of the regulation switching element 320 is coupled with a regulator controller 318. A third terminal of the regulation switching element 320 is coupled to a first terminal of an inductor L2 and to a cathode of a regulator diode D2. A second terminal of the inductor L2 is coupled to a Node Vin. An anode of the regulator diode D2 is coupled to ground. The regulator controller 318 is also coupled to ground. The intermediate regulator 160 uses a feedback signal provided by a feedback loop comprising the regulation circuit 190 and a shunting diode 352. A cathode of the shunting diode 352 is coupled to a Node Vout. The Node Vout is an output that is incident with the output voltage Vout. An anode of the shunting diode 352 is coupled to a first terminal of the regulation circuit 190. A second terminal of the regulation circuit 190 is coupled to the regulator controller 318. The intermediate regulator 160 generates the regulated voltage Vin using the regulator controller 318 for controlling a duty cycle of the regulation switching element 320.

The intermediate regulator 160 uses a feedback signal provided by a feedback loop comprising the regulation circuit 190 and the shunting diode 352. The intermediate regulator 160 generates the regulated voltage Vin using the regulator controller 318 for controlling a duty cycle of the regulation switching element 320. The inductor L2 alternately stores and passes power to the output converter 180 and through the regulator diode D2.

Suitable components can be chosen for the intermediate regulator 160 depending on the output requirements for the power apparatus 300. In an exemplary embodiment, the regulator switching element 320 comprises a silicon (Si) or silicon carbide (SiC) MOSFET transistor. The regulator diode D2 can also comprise a silicon (Si) or silicon carbide (SiC) material. The regulator controller 318 can comprise a logic device that includes a pulse width modulation (PWM) function. Such PWM controllers are known to a person of skill in the art.

The intermediate regulator 160 being configured as a buck converter uses the regulator controller 318 to adjust the duty cycle of the regulator switching element 320 such that the regulated voltage Vin at an input to the output converter 180 is regulated and lower than the minimum output voltage of the input converter 140. The regulated voltage Vin comprises a fixed DC voltage. The intermediate regulator 160 is configured to provide the regulated fixed voltage Vin that is as close as possible to the minimum output voltage of the input converter 140 in order to maximize an efficiency of the power apparatus 300. In an exemplary embodiment the regulated voltage is 200 VDC. Alternatively, the regulated voltage is 175 VDC.

In some embodiments, D5 and Q5 315 are added to the topology shown to make use of the inductor L2 and capacitor C1 330 already present to form a boost converter during an outage. When an outage occurs, the voltage on the main bulk capacitor C1 330 on the output from the PFC stage quickly decreases to the point that the following buck converter can no longer operate and still produce adequate voltage at its output. To that end, the additional components D5 and Q5 215 are preferably controlled by PWM by U4 318 when the input to the buck converter falls below the output. The voltage across the bulk capacitor will then be boosted rather than bucked and allow increased hold up time while the bulk capacitor discharges to smaller voltages. Preferably, during standard operation while power is being provided D5 remains forward biased and conducting and Q5 315 remains off and appears as an open circuit. The switching elements 320 and 325 are able to be driven simultaneously by the driver circuit 418. By varying the duty cycle of a control signal that emanates from the circuit 418, the output of the intermediate stage 160 is able to be a higher voltage or a lower voltage than the voltage provided by the input stage 140 without reversing the polarity of the bucked or boosted voltage as was the condition with prior art solutions.

Figure 3A:
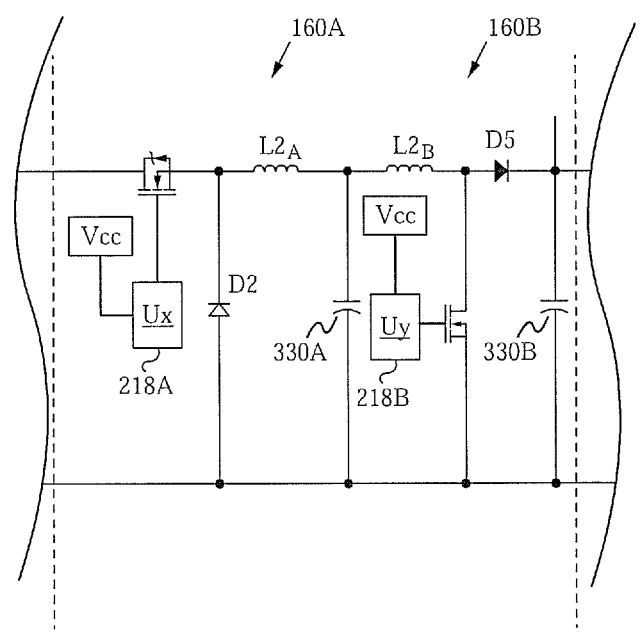
FIG. 3A illustrates a schematic diagram of an intermediate regulator of a power apparatus in accordance with an alternative embodiment of the invention.

In some embodiments, the intermediate converter 160 is able to be a buck converter 160A followed by a boost converter 160B, rather than a combined intermediate converter able to be controlled by one controller 318. In the exemplary embodiment of FIG. 3A, a buck portion 160A is followed by a boost portion 160B. The buck portion 160A comprises its own energy storing inductor L2A. Furthermore, the switch 220 is controlled by an independent control mechanism Ux, such as an integrated circuit. The buck portion is followed by a boost portion 160B. Similarly, the boost portion includes its own energy storage inductor L2B. The switch 215 is controlled by a second independent controller Uy. Preferably, during a buck configuration, the controller Uy disables the switch 215. Similarly, during a boost configuration, the controller Ux preferably enables the switch 220. The values of L2A and L2B should be chosen such that their combined serial value is the appropriate to form the desired buck or boost level.

Figure 4:
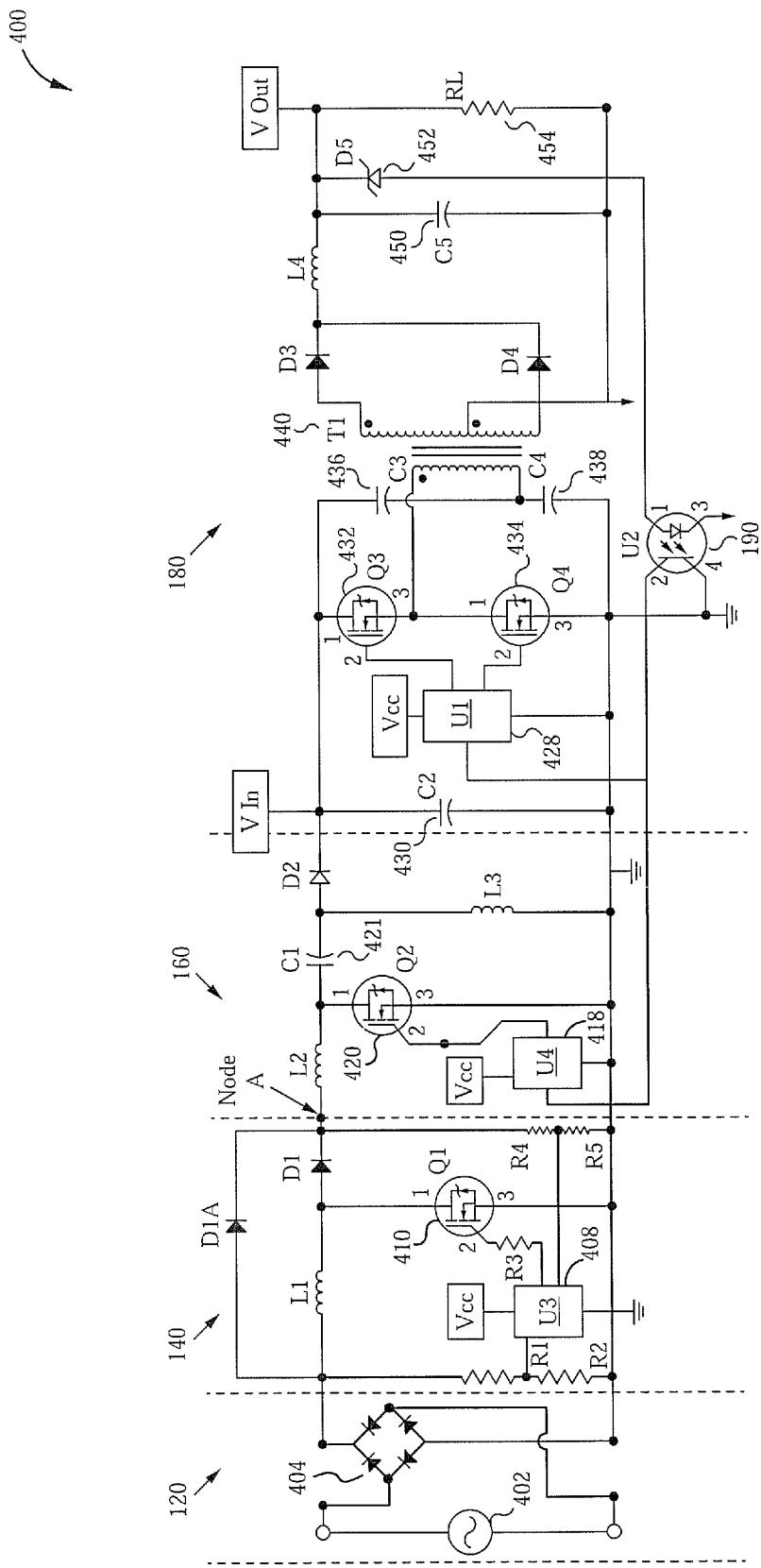
FIG. 4 illustrates a schematic diagram of a power apparatus in accordance with another embodiment of the invention.

FIG. 4 illustrates another alternative exemplary schematic of the regulated power apparatus 100 of FIG. 1A. A regulated power apparatus 400 is provided according to an embodiment of the present invention. The apparatus 400 is configured as a boost-intermediate stage isolated regulated power converter. The apparatus 400 generally includes an AC input 120 coupled with an input converter 140. The input converter 140 is coupled with an intermediate regulator 160 comprising a buck regulator which is coupled with an output converter 180. A regulation circuit 190 is coupled between the intermediate regulator 160 and the output converter 180.

The AC input 120 includes an input for receiving an AC signal 402 and a four-diode bridge 404. The AC signal 402 typically is in the range of 90-265 VAC. The AC signal 402 is rectified by the four-diode bridge 404 to generate a rectified voltage that is an unregulated DC voltage. An electromagnetic interference (EMI) and an radio frequency interference (RFI) filter (not shown) can be included in the AC input to eliminate unwanted harmonic noise.

The four-diode bridge 404 has an input and an output. The AC input voltage 402 is coupled to the input of the four-diode bridge 404. The positive output terminal of the four-diode bridge 404 is coupled to a first terminal of an inductor L1 and to the anode of a boosting diode D1A. The second terminal of the inductor L1 is coupled to a first terminal of a boost switching element 410 and to the anode of a boosting diode D1. The cathodes of the boosting diodes D1, D1A are coupled to Node A. The negative output terminal of the four-diode bridge 404 is coupled to the circuit ground. A second terminal of the switching element 410 is coupled with a boost controller 408 through resistor R3. A voltage divider R1, R2 is coupled to an input of the boost controller 408 and coupled between the first terminal of the inductor L1 and ground. A voltage divider R4, R5 is coupled to the boost controller 408 and coupled between the Node A and ground. A third terminal of the switching element 410 is coupled to ground. The boost controller 408 is coupled to ground.

The input converter 140 receives the rectified voltage and generates an increased voltage. The input converter 140 is configured to function as a boost follower. A resistive network is coupled with the boost follower controller 408 comprising resistors R1-R5. Suitable components can be chosen for the input converter 140 depending on the output requirements for the power apparatus 400. In an exemplary embodiment, the boost switching element 410 comprises a silicon (Si) or silicon carbide (SiC) MOSFET transistor. The boosting diodes D1, D1A can also comprise a silicon (Si) or silicon carbide (SiC) material. The boost follower controller 408 can comprise a logic device that includes a pulse width modulation (PWM) function. Such PWM controllers are known to a person of skill in the art.

The input converter 140 can be configured to operate as a power factor correction (PFC) front-end. The input converter 140 uses the boost follower controller 408 to adjust the duty cycle of the boost switching element 410 such that an input current and a line frequency of the AC signal 402 are the same phase. Thereby providing a power factor of the power apparatus 400 that approaches unity (1.0). The input converter 140 generates the increased voltage using the boost follower controller 408 for controlling a duty cycle of the boost switching element 410 whereas the inductor L1 stores and passes the increased voltage via the boosting diodes D1, D1A. The input converter 140 being configured as a boost follower can generate the increased voltage such that the potential of the increased voltage varies proportionally depending on a potential of the AC signal 402. The boost follower function allows the input converter 140 to generate the increased voltage that is only slightly higher than the AC signal 402. The resistor network R1-R5 facilitates the boost follower function and provides a feedback signal to the boost follower controller 408. For example, the input converter 140 generates an increased voltage of 250 VDC for the AC signal 402 of 115 VAC. Alternatively, the input converter 140 generates an increased voltage of 385 VDC for the AC signal 402 of 230 VAC.

The intermediate regulator 160 receives the increased voltage and generates a regulated voltage Vin. The intermediate regulator 160 is configured as a single ended primary inductive converter or SEPIC converter. The SEPIC converter 160 can provide a longer hold-up time then a buck type converter. The SEPIC converter 160 can also provide the regulated voltage Vin that can have a lower voltage or a higher voltage than a minimum output voltage of the input converter 140. Thus, allowing the intermediate regulator 160 a wider range of voltage potential values for the regulated voltage Vin.

The intermediate regulator 160 includes a first terminal of a series inductor L2 coupled to the Node A. A second terminal of the series inductor L2 is coupled to a first terminal of a regulation switching element 420 and to a first terminal of a series capacitor 421. A second terminal of the regulation switching element 420 is coupled with a regulator controller 418. A third terminal of the regulation switching element 420 is coupled to ground. A second terminal of the series capacitor 421 is coupled to a first terminal of the parallel inductor L3 and to an anode of a regulator diode D2. A cathode of the regulator diode D2 is coupled to a Node Vin. A second terminal of the parallel inductor L3 is coupled to ground. The regulator controller 418 is also coupled to ground. The intermediate regulator 160 uses a feedback signal provided by a feedback loop comprising the regulation circuit 190 and a shunting diode 452. A cathode of the shunting diode 452 is coupled to a Node Vout. The Node Vout is an output that is incident with the output voltage Vout. An anode of the shunting diode 452 is coupled to a first terminal of the regulation circuit 190. A second terminal of the regulation circuit 190 is coupled to the regulator controller 418. The intermediate regulator 160 generates the regulated voltage Vin using the regulator controller 418 for controlling a duty cycle of the regulation switching element 420. Alternatively, an input parallel capacitor (not shown) can be coupled with the first terminal of the series inductor L2 and ground to reduce a parasitic inductance and internal resistance of the intermediate regulator 160.

The intermediate regulator 160 generates the regulated voltage Vin using the regulator controller 418 for controlling a duty cycle of the regulation switching element 420. When the regulation switching element 420 is cycled on, the series inductor L2 is supplied a charging current from the increased voltage of the input converter 140. The parallel inductor L3 is supplied a charging current from the series capacitor 421. When the regulation switching element 420 is cycled off, the series inductor L2 and the parallel inductor L3 supply a discharge current via the regulator diode D2 to an input capacitor 430 of the output converter 180.

Suitable components can be chosen for the intermediate regulator 160 depending on the output requirements for the power apparatus 400. In an exemplary embodiment, the regulator switching element 420 comprises a silicon (Si) or silicon carbide (SiC) MOSFET transistor. The regulator diode D2 can comprise a silicon (Si) or silicon carbide (SiC) material, and can comprise a Schottky diode. The regulator controller 418 can comprise a logic device that includes a pulse width modulation (PWM) function. Such PWM controllers are known to a person of skill in the art.

The intermediate regulator 160 being configured as a SEPIC uses the regulator controller 418 to adjust the duty cycle of the regulator switching element 420 such that the regulated voltage Vin at an input to the output converter 180 is regulated and either higher or lower than the minimum output voltage of the input converter 140. The regulated voltage Vin comprises a fixed DC voltage. A person of skill in the art will appreciate that a buck-boost converter (not shown) can be substituted for the SEPIC converter 160 since the buck-boost converter can also provide the regulated voltage Vin that can have a higher or lower potential than the increased voltage. The buck-boost converter (not shown) can include a series regulator switching element (not shown) coupled with a parallel inductive element (not shown) and coupled with a series diode element (not shown).

The output converter 180 is configured to receive the regulated voltage Vin and to generate an output voltage Vout. The output converter 180 is configured as an isolation stage, as described above. The output converter 180 includes a first terminal of an input capacitor 430 coupled to the Node Vin and a second terminal of the input capacitor 430 coupled to ground. A first terminal of a first switching element or output switch 432 is coupled to the Node Vin and to a first terminal of a first isolation capacitor 436. The second terminal of the first switching element 432 is coupled with an output controller 428. A third terminal of the first switching element 432 is coupled to a first terminal of a second switching element or output switch 434 and to a first primary terminal of a transformer 440. The second terminal of the first isolation capacitor 436 is coupled to the first terminal of the second isolation capacitor 438 and coupled to the second primary terminal of the transformer 440. The second terminal of the second switching element 434 is coupled with the output controller 428. The output controller 428 is coupled to the second terminal of the regulation circuit 190. The output controller 428 is also coupled to ground. The third terminal of the second switching element 434 and the second terminal of the second isolation capacitor 438 are coupled to ground. A third and a fourth terminal of the regulation circuit 190 are coupled to ground.

An anode of a first output diode D3 is coupled to a first secondary terminal of the transformer 440. A cathode of the first output diode D3 is coupled to a first terminal of an output inductor L4 and to a cathode of a second output diode D4. An anode of the second output diode D4 is coupled to a second secondary terminal of the transformer 440. A center-tap of the transformer 440 is coupled to ground. A second terminal of the output inductor L4 is coupled to a first terminal of an output capacitor 450 and to the Node Vout. A second terminal of the output capacitor 450 is coupled to ground. A load 454 is coupled between the Node Vout and ground.

In operation, a SEPIC converter 160 has become popular in recent years in battery-powered systems that must step up or down depending upon the charge level of the battery. when the power switch is turned on, the inductor L2 is charged from the input converter 140. The second inductor L3 takes energy from the first capacitor C1 421, and the output capacitor C2 is left to provide the load current. The fact that both L2 and L3 are disconnected from the load when the switch is on leads to complex control characteristics. When the switch 420 is disabled, the first inductor L2 charges the capacitor C1 and also provides current to the output converter 180. The second inductor L3 is also connected to the output converter 180 during this time. The output capacitor C2 sees a pulse of current during the off time, making it inherently noisier than a buck converter. The input current is non-pulsating, a distinct advantage in running from a battery supply.

When the switch 420 is disabled, the current through the capacitor C1 becomes the same as the current in the inductor L3, since inductors do not allow instantaneous changes in current. The current through the inductor L2 will not reverse direction. When the switch 420 is disabled, power is delivered to the output converter 180 from both L3 and L2. The capcitor C1, however is being charged by L1 during this off cycle, and will in turn recharge L2 during the on cycle.

The output converter 180 generates the output voltage Vout using the output controller 428. The output controller 428 monitors the output voltage Vout and controls the duty cycle of the first and second output switches 432, 434. The output controller reduces or increases the duty cycle of the first and second output switches 432, 434 if the output voltage Vout increases or decreases respectively. The output controller 428 generates a control signal for controlling the duty cycle of the first and second output switches 432, 434. The output controller 428 controls a conduction of the first and second output switches 432, 434 such that only one of the first and second output switches 432, 434 conducts at a time. The conduction of the first and the second output switches 432, 434 alternately generate a forward bias current in the first and the second output diodes D3, D4 respectively. The forward bias current is generated from an expanding and collapsing magnetic field of the transformer 440. The conduction of the output diodes D3, D4 alternately charge the output capacitor 450 via the output inductor L4.

Suitable components can be chosen for the output converter 180 depending on the output requirements for the power apparatus 400. In an exemplary embodiment, the first and second output switches 432, 434 comprises a silicon (Si) or silicon carbide (SiC) MOSFET transistor. The output diodes D3, D4 can also comprise a silicon (Si) or silicon carbide (SiC) material. The output controller 428 can comprise a logic device that includes a pulse width modulation (PWM) function. Such PWM controllers are known to a person of skill in the art. The regulation circuit 190 can comprise a suitable feedback circuit which can be and is not limited to an optical isolator. The shunting diode 452 can comprise a zener diode made of suitable material known to a person of skill in the art. A size can be chosen for the input capacitor 430 depending on a holdup time specification chosen for the power apparatus 400.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A regulated power apparatus comprising:
   a. an AC input circuit for receiving an AC voltage and generating a rectified voltage;

b. an input power converting circuit for receiving the rectified voltage and generating an increased voltage;

c. an intermediate power regulating circuit for receiving the increased voltage and configured to selectively switch between generating a regulated output voltage that is higher than a minimum value of the increased voltage in a boost mode and generating a regulated output voltage that is lower than the minimum value of the increased voltage in a buck mode;

d. an output isolation circuit for receiving the regulated output voltage and generating a DC isolated output; and e. a regulation circuit coupled between the intermediate power regulating circuit and an output of the output isolation circuit for generating a control signal for operating a regulation switching element of the intermediate power regulating circuit.

2. The apparatus of claim 1, wherein the output isolation circuit comprises an LLC resonant converter.

3. The apparatus of claim 2, wherein the LLC resonant converter operates at its resonant frequency.

4. The apparatus of claim 1, wherein the output isolation circuit comprises full bridge forward converter.

5. The apparatus of claim 4 wherein the full bridge forward converter operates at a fixed duty cycle.

6. The apparatus of claim 1, wherein the input power converting circuit comprises a boost converter comprising a boost switching element coupled with an inductive element and a plurality of boost diode devices.

7. The apparatus of claim 6, wherein the boost converter is configured with a power factor correction function for bringing a power factor of the power apparatus to substantially one.

8. The apparatus of claim 7, wherein the boost converter is configured as a boost follower, wherein the increased voltage is greater than the rectified voltage.

9. The apparatus of claim 8, wherein the boost follower includes a boost follower controller coupled with the boost switching element.

10. The apparatus of claim 7, wherein the intermediate power regulating circuit comprises a buck converter comprising the regulation switching element coupled with an inductive element and coupled with a regulator diode device.

11. The apparatus of claim 7, wherein the intermediate power regulating circuit comprises a single-ended primary inductance converter, wherein the regulated voltage has one of a lower voltage and a higher voltage than a minimum output voltage of the input power converting circuit, the single-ended primary inductance converter comprising the regulation switching element coupled with an inductive element and a capacitive element, the capacitive element coupled with a second inductive element and a diode device.

12. The apparatus of claim 7, wherein the intermediate power regulating circuit comprises a buck-boost converter comprising a regulation switching element coupled with an inductive element and a passing device, the regulation switching element coupled in series with an input of the buck-boost converter.

13. The apparatus of claim 7, wherein the output isolation circuit comprises a buck converter configured to operate at a fixed duty cycle.

14. The apparatus of claim 7, further comprising an output capacitor coupled with the output isolation circuit.

15. A regulated power apparatus comprising:

a. an input boost converter for receiving a rectified voltage and generating a first voltage;

b. an intermediate buck/boost converter for receiving the first voltage and generating a second voltage, wherein the intermediate buck/boost converter comprises a boost converter circuit that causes the second voltage to have a voltage value that is greater than the first voltage and a buck converter circuit that causes the second voltage to have a voltage value that is less than the first voltage;

c. an output isolation circuit for receiving the second voltage and generating a third voltage; and d. a regulation circuit coupled with the intermediate buck/boost converter and coupled with the output isolation circuit, the regulation circuit including a feedback signal for generating a control signal for operating a regulation switching element of the intermediate buck/boost converter;

wherein the intermediate buck/boost converter is configured to selectively couple either the boost converter circuit or the buck converter circuit to the output isolation current to generate the second voltage.

16. The apparatus of claim 15, wherein the first voltage is higher than the rectified voltage.

17. The apparatus of claim 15, wherein the second voltage is different than the first voltage.

18. The apparatus of claim 15, wherein the third voltage is isolated from the first voltage.

* * * * *